United States Patent
Vasconcelos et al.

(10) Patent No.: US 11,263,550 B2
(45) Date of Patent: Mar. 1, 2022

(54) AUDIT MACHINE LEARNING MODELS AGAINST BIAS

(71) Applicant: INTERNATIONAL BUSINESS MACHINES CORPORATION, Armonk, NY (US)

(72) Inventors: Marisa Affonso Vasconcelos, Sao Paulo (BR); Carlos Henrique Cardonha, Sao Paulo (BR)

(73) Assignee: INTERNATIONAL BUSINESS MACHINES CORPORATION, Armonk, NY (US)

(*) Notice: Subject to any disclaimer, the term of this patent is extended or adjusted under 35 U.S.C. 154(b) by 744 days.

(21) Appl. No.: 16/125,741

(22) Filed: Sep. 9, 2018

(65) Prior Publication Data

US 2020/0082299 A1   Mar. 12, 2020

(51) Int. Cl.
| | |
|---|---|
| *G06F 21/62* | (2013.01) |
| *G06N 99/00* | (2019.01) |
| *G06F 16/24* | (2019.01) |
| *G06K 9/62* | (2022.01) |
| *G06N 20/00* | (2019.01) |
| *G06N 5/04* | (2006.01) |

(52) U.S. Cl.
CPC ............. *G06N 20/00* (2019.01); *G06N 5/045* (2013.01)

(58) Field of Classification Search
CPC .............................. G06N 20/00; G06N 5/045
USPC ....................................................... 706/1–62
See application file for complete search history.

(56) References Cited

U.S. PATENT DOCUMENTS

| | | |
|---|---|---|
| 7,099,942 B1 | 8/2006 | Wilson et al. |
| 8,452,718 B2 | 5/2013 | Jin et al. |
| 8,965,814 B1 | 2/2015 | Rangan |
| 2002/0169735 A1 | 11/2002 | Kil et al. |
| 2003/0063596 A1* | 4/2003 | Arslan .............. H04L 25/03993 370/347 |
| 2006/0042483 A1 | 3/2006 | Work et al. |

(Continued)

FOREIGN PATENT DOCUMENTS

WO    2017/180608 A1    10/2017

OTHER PUBLICATIONS

Salmon, F. P. et al., "Optimized Pre-Processing for Discrimination Prevention"; NIPS (2017); 10 pgs.

(Continued)

*Primary Examiner* — Brandon S Cole
(74) *Attorney, Agent, or Firm* — Intelletek Law Group, PLLC; Gabriel Daniel, Esq.

(57) ABSTRACT

A method and system of mitigating bias in a decision-making system are provided. A presence of bias is identified in one or more machine learning models. For each of the machine learning models, a presence of bias in an output of the model is determined. One or more options to mitigate a system bias during a processing stage, based on the identified presence of bias for each of the one or more models, are determined. One or more options to mitigate the system bias during a post-processing stage, based on the identified presence of bias in each output of the models, are determined. A combination of options is provided, including (i) a processing option for the processing stage, and (ii) a post-processing option for the post-processing stage, wherein the combination of options accommodates a threshold bias limit to the system bias and a total bias mitigation cost threshold.

17 Claims, 7 Drawing Sheets

(56) References Cited

U.S. PATENT DOCUMENTS

| | | | |
|---|---|---|---|
| 2007/0038600 A1 | 2/2007 | Guha | |
| 2009/0150308 A1* | 6/2009 | Wang | G06K 9/723 |
| | | | 706/12 |
| 2009/0300781 A1* | 12/2009 | Bancroft | C12Q 1/6895 |
| | | | 800/13 |
| 2010/0010788 A1* | 1/2010 | De Crecy | G06F 30/20 |
| | | | 703/2 |
| 2010/0280985 A1* | 11/2010 | Duchon | G06Q 10/10 |
| | | | 706/52 |
| 2011/0028827 A1* | 2/2011 | Sitaram | A61B 5/055 |
| | | | 600/410 |
| 2011/0106743 A1* | 5/2011 | Duchon | G06F 16/35 |
| | | | 706/46 |
| 2011/0255641 A1* | 10/2011 | Lopez | H04L 25/03006 |
| | | | 375/343 |
| 2013/0030819 A1* | 1/2013 | Purnhagen | G10L 19/008 |
| | | | 704/500 |
| 2015/0100530 A1* | 4/2015 | Mnih | G06N 20/00 |
| | | | 706/25 |
| 2015/0206064 A1 | 6/2015 | Levman | |
| 2015/0254555 A1 | 9/2015 | Williams, Jr. et al. | |
| 2015/0371191 A1 | 12/2015 | Taylor et al. | |
| 2016/0170996 A1* | 6/2016 | Frank | G06F 16/24578 |
| | | | 707/748 |
| 2016/0224666 A1 | 8/2016 | Horvitz et al. | |
| 2016/0224803 A1* | 8/2016 | Frank | G06F 16/24578 |
| 2017/0293858 A1* | 10/2017 | Larsen | G06Q 10/1053 |
| 2017/0330058 A1* | 11/2017 | Silberman | G06N 20/00 |
| 2017/0337343 A1* | 11/2017 | Kakadiaris | G16H 50/50 |
| 2019/0147300 A1* | 5/2019 | Bathen | G06K 9/6284 |
| | | | 706/12 |

OTHER PUBLICATIONS

Corbett-Davies, S. et al., "Algorithmic Decision Making and the Cost of Fairness"; In Proceedings of the 23rd ACM SIGKDD International Conference on Knowledge Discovery and Data Mining (KDD '17). ACM (2017); pp. 797-806.

Dwork, C. et al., "Fairness Through Awareness"; Microsoft Research (2011); Silicon Valley, Mountain View, CA 24 pgs.

Hajian. S. et al., "A Methodology for Direct and Indirect Discrimination Prevention in Data Mining"; IEEE (2013); vol. 25:7; pp. 1445-1459.

Kamiran, F. et al., "Decision Theory for Discrimination-Aware Classification"; IEEE (2012); pp. 924-929.

Kamiran, F. et al., "Classification with No Discrimination by Preferential Sampling"; In Proceedings of the 19th Machine Learning conference of Belgium and The Netherlands (2010); 6 pgs.

Kamiran, F. et al., "Classifying without Discriminating"; Eindhoven University of Technology, The Netherlands (XXXX) 6 pgs.

Kamiran, F. et al., "Discrimination Aware Decision Tree Learning"; ICDM (2010); 6 pgs.

Kamishima, T. et al., Fairness-Aware Classifier with Prejudice Remover Regularizer; P. Flach et al. (Eds.): ECML PKDD 2012, Part II, LNCS 7524, Springer-Verlag Berlin Heidelberg (2012); pp. 35-50.

Vasconcelos, M. "Modeling Epistemological Principles for Bias Mitigation in AI Systems: An Illustration in Hiring Decisions"; https://arxiv.org/abs/1711.07111; (2017); 7pgs.

Zafar, M. B. et al. "Fairness Beyond Disparate Treatment & Disparate Impact: Learning Classification without Disparate Mistreatment"; ACM (2017); 10 pgs.

Zafar, M. B. et al., "Fairness Constraints: Mechanisms for Fair Classification"; AISTATS (2017); 12 pgs.

* cited by examiner

AUDIT MACHINE LEARNING MODELS AGAINST BIAS

BACKGROUND

Technical Field

The present disclosure generally relates to artificial intelligence, and more particularly, to evaluating machine learning models for bias.

Description of the Related Art

In recent years, machine learning models have been applied in increasing number of areas, such as recommendation engines, prediction models supporting autonomous self-driving cars, etc. These models are applied for different types of inferences, including, for example, the probability of a person to be a criminal, the health conditions of an individual, his/her employability potential, credit score assessments, and the like. However, most machine learning models used today are not fully interpretable, in that they behave as black-box algorithms whose behavior may not be predictable. The automated decisions generated by the machine learning models can lead, even in the absence of intent, to a lack of fairness, where the outcomes can disproportionately benefit or hurt different groups of people sharing one or more attributes (e.g., race, religion, gender, etc.). Consequently, trained classification systems may be subject to bias.

SUMMARY

According to various exemplary embodiments, a computing device, a non-transitory computer readable storage medium, and a method are provided to mitigate bias in a decision-making system. A presence of bias in one or more machine learning models of the decision-making system is identified. For each of the one or more machine learning models, a presence of bias in an output of the machine learning model is identified. One or more options to mitigate a system bias during a processing stage, based on the identified presence of bias for each of the one or more machine learning models, are determined. One or more options to mitigate the system bias during a post-processing stage, based on the identified presence of bias in each output of the one or more machine leaning models are determined. A combination of options, including (i) at least one processing option for the processing stage selected from the one or more options to mitigate the system bias during the processing stage, and (ii) at least one post-processing option for the post-processing stage selected from the one or more options to mitigate the system bias during the post-processing stage are provided. The combination of options accommodates a threshold bias limit to the system bias and a total bias mitigation cost threshold of the decision-making system.

In one embodiment, a presence of bias in a training data of the decision-making system is identified.

In one embodiment, each of the one or more models is based on the training data.

In one embodiment, one or more options to mitigate a system bias during a pre-processing stage, based on the determined presence of bias in the training data, are determined.

In one embodiment, the combination of options further includes at least one pre-processing option for the pre-processing stage selected from the one or more options to mitigate the system bias during the pre-processing stage.

In one embodiment, the total bias mitigation cost threshold is based on (i) a computing resources involved, (ii) a time involved, (iii) an energy involved, or (iv) a monetary cost, of the combination of options.

In one embodiment, the processing stage and the post-processing stage each have a different type of bias mitigation cost.

In one embodiment, an equalization factor is applied to the type of cost of the processing stage to obtain a universal cost of each option of the processing stage. An equalization factor is applied to the type of cost of the post-processing stage to obtain a universal cost of each option of the post-processing stage. The total bias mitigation cost threshold of the decision-making system is based on a total universal cost of the selected processing option for the processing stage plus the selected post-processing option for the post-processing stage.

In one embodiment, one or more sensitive attributes used in the decision-making system are identified and reported as a (i) biased feature or (ii) a leak of private information.

These and other features will become apparent from the following detailed description of illustrative embodiments thereof, which is to be read in connection with the accompanying drawings.

BRIEF DESCRIPTION OF THE DRAWINGS

The drawings are of illustrative embodiments. They do not illustrate all embodiments. Other embodiments may be used in addition or instead. Details that may be apparent or unnecessary may be omitted to save space or for more effective illustration. Some embodiments may be practiced with additional components or steps and/or without all of the components or steps that are illustrated. When the same numeral appears in different drawings, it refers to the same or like components or steps.

DETAILED DESCRIPTION

Overview

In the following detailed description, numerous specific details are set forth by way of examples in order to provide a thorough understanding of the relevant teachings. However, it should be apparent that the present teachings may be practiced without such details. In other instances, well-known methods, procedures, components, and/or circuitry have been described at a relatively high-level, without detail, in order to avoid unnecessarily obscuring aspects of the present teachings.

The present disclosure generally relates to artificial intelligence, and more particularly, to evaluating trained classification systems, sometimes referred to herein as decision-making systems, for bias. Today, machine learning models are applied in various fields for decision making. While decision making systems using machine learning models may not intentionally be configured to have a disparate impact and/or treatment, sometimes collectively referred to herein as bias, it may still lead to unfair results. For example, such machine learning models may inherit any bias or discrimination present in the data on which they are trained.

An automated decision-making system suffers from disparate treatment if its decisions are at least in part based on the subject's sensitive attribute information, and it has disparate impact if its outcomes disproportionally affect (positively or negatively) people with attributes deemed sensitive by society (e.g., gender, color, ethnicity, nationality, disability, marital status, age, etc.). For example, race and financial credit scores may be correlated in a scenario by a machine learning model, where such correlation should not take place (i.e., the credit scoring system should be oblivious to the element of race). Discrimination can be either direct or indirect. Direct discrimination occurs when decisions are made based on sensitive attributes. Indirect discrimination occurs when decisions are made based on non-sensitive attributes that are strongly correlated with biased sensitive ones.

Figure 1:
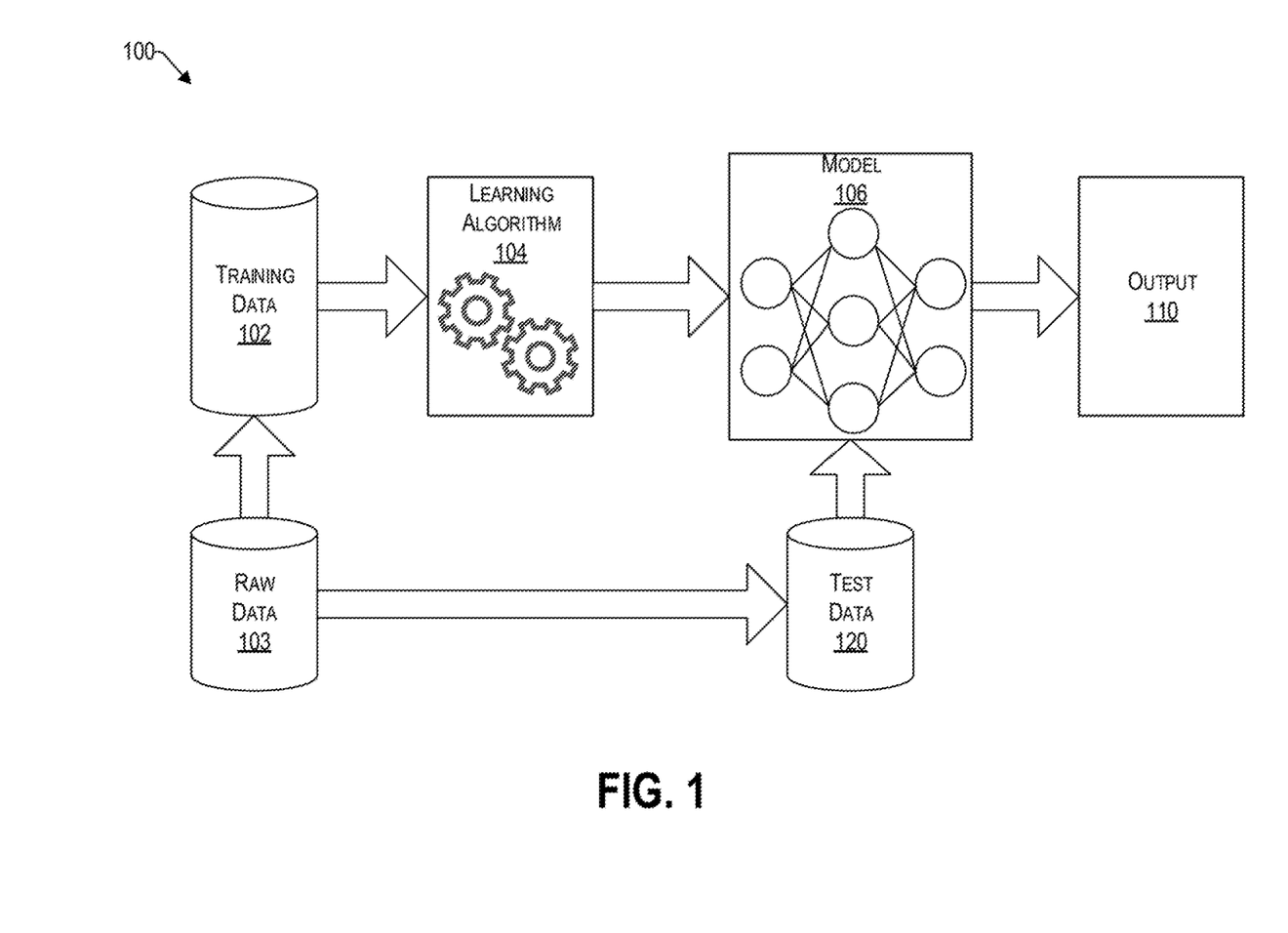
FIG. 1 illustrates various components of a machine learning system for decision making and/or classification, consistent with an illustrative embodiment.

FIG. 1 illustrates various components of a machine learning system 100 for decision making and/or classification, consistent with an illustrative embodiment. The machine learning system 100 is configured to use algorithms 104 that can learn from and/or make predictions based on a corpus of training data 102 provided thereto, based on raw data 103. Such learning algorithms 104 operate by building a model 106 from stored prior inputs or baselines therefrom in order to make data-driven predictions or decisions, rather than following strictly static criteria.

In various embodiments, the machine learning discussed herein may be supervised or unsupervised. In supervised learning, the learning algorithm may be presented with example training data 102 of threshold conditions. Stated differently, the training data 102 acts as a teacher for the learning algorithm 104. In unsupervised learning, the training data 102 does not provide any labels as what is acceptable, rather, it simply provides historic data to the learning algorithm 104 that can be used to find its own structure among the data 102 to create a model 106 therefrom. The model 106 may then be used to create an output 110 (e.g., Yes or No, scale 1 to N, etc.) to later classify test data 120 that is presented to the model 106.

Contributing factors in algorithmic discrimination in the system 100 are from three main sources, namely: (i) the training data 102 (which can be cured in a pre-processing stage), (ii) the learning algorithm 104 in creating the model (which can be cured in a processing stage), and (iii) the output 110 (which can be cured in a post-processing stage). In this regard, algorithmic discrimination prevention involves modifying one or more of these three sources, and possibly others, to ensure that decisions made by the model 106 are mitigated for bias.

While mitigation of each individual discrimination factor is known, such mitigation approaches are typically focused on optimization of each factor individually, which may not yield the most satisfactory or computationally efficient results. For example, optimization of each contributing factor individually to mitigate bias may be computing resource intensive, energy consuming, or simply not possible. For example, optimization of the pre-processing stage may indicate that additional data should be used to improve a sample size of individuals surveyed. However, such recommendation may be impossible (e.g., an event that the data is based on, such as an election, has passed) or may be impractical to perform (e.g., may involve years to perform). Similarly, different models 106 may be of different computational complexity and therefore involve different computational resources. Thus, different models 106 may be of different computational efficiency.

Thus, instead of optimizing each contributing factor of bias individually, applicants have identified that taking a multi-dimensional approach to these contributing factors provides a more efficient mitigation of the bias. For example, in one scenario, it may be more efficient to use a more conservative data set (i.e., pre-processing stage) that is in harmony with a model that does not involve substantial computational resources (i.e., processing stage), but take a more aggressive approach of the output (i.e., post-processing stage). In other scenarios, a mild bias mitigation approach in the pre-processing stage, an aggressive mitigation approach in the processing stage, and a mild mitigation approach to bias in the post-processing stage, may be more effective to mitigate overall bias in the system 100. Of course, other combinations of approaches may be performed as well, based on an identified rule set, discussed in more detail later.

Accordingly, what is provided herein is a multidimensional approach to the three main contributing factors in algorithmic discrimination, thereby more effectively mitigating and/or eliminating bias in an automated decision-making system using machine learning models 100, based on a rule set governing the bias analysis.

In one aspect, the present disclosure provides a system that evaluates machine learning models with respect to data bias and suggests or triggers mitigation actions capable of reducing or even eliminating the bias. A rule set may provide a threshold level of bias to be certified as being non-discriminatory compliant. Accordingly, the teachings herein can be used in various applications, including, without limitation, entities that provide certification (e.g., compliance labels) to their machine learning models, indicating whether the code and/or system offered by the entity has a non-discriminatory and equal-opportunity behavior.

In another aspect, the bias mitigation system can identify sensitive attributes that are used by the automated decision-making system and report them to an appropriate party as leak of private information.

By virtue of the concepts discussed herein, an automated decision-making system can be mitigated for bias to a predetermined threshold in an efficient way. The techniques described herein may be implemented in a number of ways. Example implementations are provided below with reference to the following figures.

Example Architecture

Figure 2:
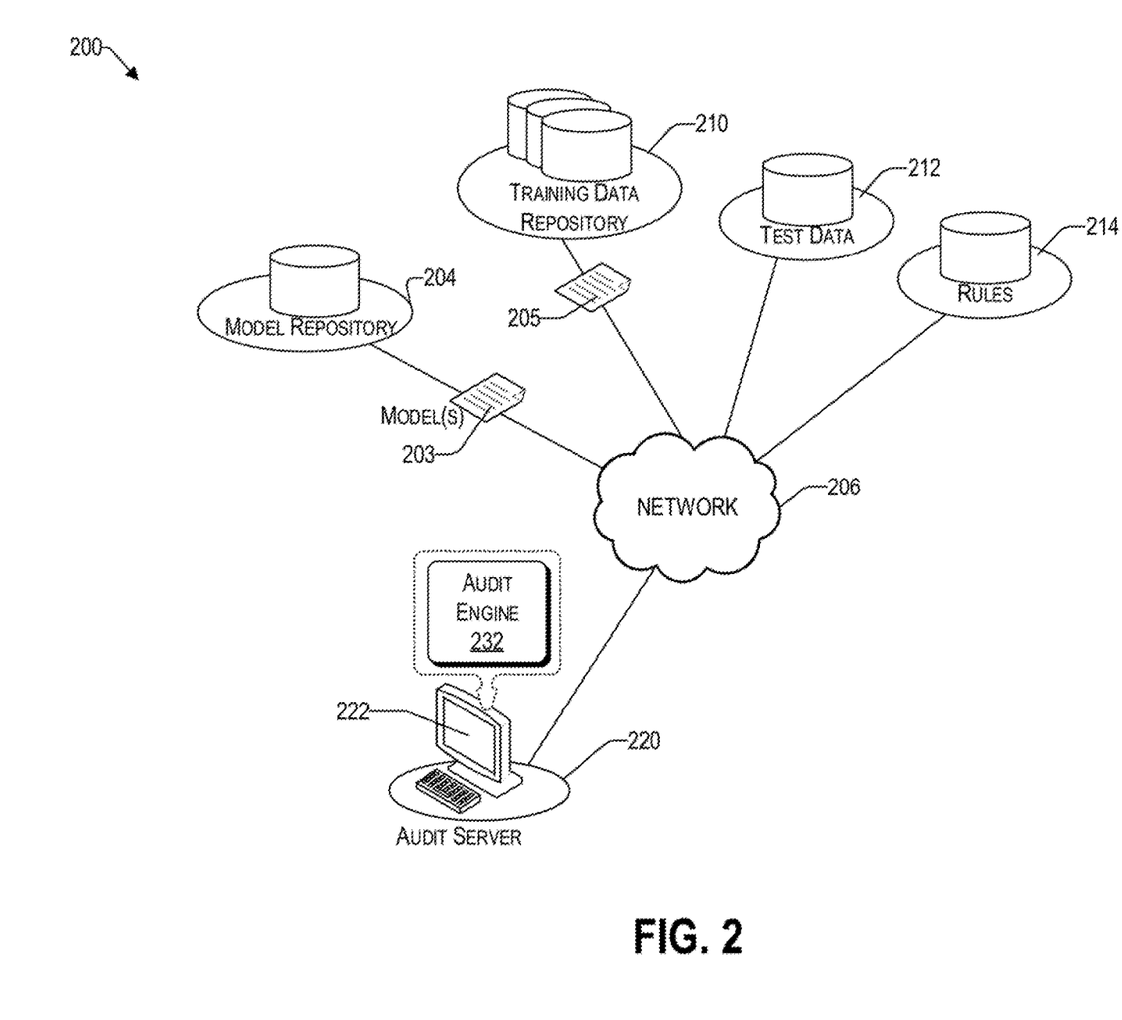
FIG. 2 is an example architecture for implementing a system that audits an automated decision-making system against bias, consistent with an illustrative embodiment.

FIG. 2 is an example architecture 200 for implementing a system that audits an automated decision-making system against bias, consistent with an illustrative embodiment. Architecture 200 includes a network 206 that allows an audit server 220 to communicate with various components that are connected to the network 206, such as a model repository 204, a training data source 210, test data database 212, and a rules database 214.

The network 206 may be, without limitation, a local area network ("LAN"), a virtual private network ("VPN"), a cellular network, the Internet, a cable network, digital satellite TV network, or a combination thereof. For example, the network 206 may include a mobile network that is communicatively coupled to a private network, sometimes referred to as an intranet, which provides various ancillary services, such as communication with various media content sources, databases, and the Internet. To facilitate the present discussion, network 206 will be described, by way of example only and not by way of limitation, as a mobile network as may be operated by a carrier or service provider to provide a wide range of mobile communication services and supplemental services or features to its subscriber customers and associated mobile device users.

The audit server 220 includes an audit engine 232 that is operative to take a multi-dimensional approach to the different contributing factors of bias in a automated decision making system that uses machine learning, to identify bias and/or provide bias mitigation therefor. To that end, the audit engine 232 is configured to evaluate the training data 205 from the training data repository 210 to provide mitigating options for the pre-processing stage, evaluate various models 203 stored in the model repository 204 to provide mitigating options for the processing stage, and evaluate outputs of different models to provide mitigating options for the post-processing stage. Significantly, the options provided for each stage are evaluated based on a multi-dimensional approach to the contributing factors of bias.

For example, the training data 205 from the training data repository 210 may, intentionally or unintentionally, be biased with respect to one or more sensitive attributes. By way of example only and not by way of limitation, consider the data being based on a major league football team that includes players and cheerleaders. In this regard, the audit engine 232 can analyze the training data 205 for inherent bias. In this example, the data may reveal that women (e.g., female cheerleaders) earn substantially less than men (e.g., football players). Of course, such conclusion may not accurately represent a predetermined segment of the population. Upon analyzing other contributing factors of bias, the audit engine 232 may provide a suggested bias mitigation measure for the pre-processing stage that is in harmony with the processing and post-processing stages (discussed in more detail later). For example, the suggestion may be to use data beyond professional sports. The sample size may be limited (i.e., to save cost) by the audit engine 232, with the understanding that additional mitigation measures will be performed in the processing and post-processing stages to mitigate the total bias to a predetermined acceptable threshold.

As discussed previously, the training data 205 from the training data repository 210 can be used to train machine learning algorithms to create one or more models 203 to provide automated decisions, like denial or grant of loan applications, employment decisions, calculation of insurance premiums, and the like.

Upon creation, the models 203 may be stored in various repositories, represented collectively by model repository 204. If the training data 210 is inherently biased for or against a particular attribute, the learned model 203 from the model repository 204 may exhibit biased behavior. For example, the model 203 may infer that being a female is a risk factor in offering a loan and therefore should be denied.

Identifying such biases, reporting, and mitigating its effects can be performed by the audit engine 232. The audit engine 232 may identify potential biases from various sources, including (i) the pre-processing stage of the system 200, represented by the training data 210, (ii) the processing stage, represented by the model store 204, and the post-processing stage, based on the output of the model 203.

During the pre-processing stage, the audit engine 232 is configured to prevent or mitigate the training data 210 from becoming itself a source of discrimination, due to data mining tasks generating discriminatory models 203 from biased data sets from the training data 210 as part of the automated decision making. Discrimination mitigation by the audit engine 232 during the pre-processing stage includes transforming the training data 210 in such a way as to prevent discriminatory bias therefrom, such that any model 203, which is based on the training data 210, is not inherently biased. To that end, various data mining algorithms and sample sizes can be suggested by the audit engine 232. The techniques used may be mild or aggressive. For example, the audit engine 232 may suggest to perform a controlled distortion of the training data from which a classifier is learned by making minimally intrusive modifications, leading to a less biased data set, with the understanding that additional bias mitigation measures are to be performed during the processing and/or post-processing stages, discussed in more detail below.

Upon optimizing the system 200 via a multi-dimensional approach to the pre-processing, processing, and post-processing stages to mitigate bias, the system 200 can then be used to process test data 212 in a computationally efficient way, while maintaining the bias level below a predetermined threshold. In various embodiments, the test data 212 may represent new information to be evaluated by a trained model 203, to provide a classification and/or decision.

In one embodiment, there is a rules database 214 that stores the constraints and/or preferences under which the system is to operate, referred to herein as a rule set. For example, the rule set, which is received by the audit engine 232 from the rules database 214, may provide bias threshold limits for each contributing factor of bias and/or automated decision-making system 200. The rule set may also provide cost limits in mitigating each contributing factor of bias and/or in aggregate for the system 200. In one embodiment, the rule set also sets limits in assessing costs associated with assessment of bias. In various embodiments the cost limits can be for each contributing factor individually and/or the system 200 collectively. As used herein, the term cost relates to at least one of (i) computing resources involved, (ii) time involved, (iii) energy involved, (iv) and monetary cost. For example, the rule set 214 may indicate that there is a cost limit in terms of a total computer resources (e.g., processing power, memory used, network requirements, risk etc.) for mitigating bias in a system. In this regard, the audit engine 232 identifies a threshold bias limit (which may be provided by the rule set) and calculates a combination of mitigating measures including the (i) pre-processing stage, (ii) processing stage, and (iii) post-processing stage combination having a lowest bias mitigation cost, while accommodating the threshold system bias limit requirement.

In some embodiments, the type of cost provided by the rule set is different for each contributing factor of bias. By way of example only, and not by way of limitation, for the pre-processing stage, using different mitigation measures may be associated with a time cost; for the processing stage, using different mitigation measures may be associated with computational resources cost; and for the post-processing stage, the cost may relate to a risk of error. In this regard, an equalization factor may be used for each contributing cost such that a universal cost can be determined. For example, energy may be translated into a monetary cost of 12c/kWh, computational cost may be translated into a monetary negotiated rate with a service provider (e.g., cloud), etc. In one embodiment, the different types of costs are evaluated in the context of a multi-objective optimization problem.

In some embodiments, the audit engine 232 is configured to identify a list of sensitive attributes for each contributing factor of bias or the system in aggregate. In this regard, each attribute may include a bias score on a predetermined scale, which can be provided on a user interface of a computing device of a subscriber of the services discussed herein. For example, the results may be displayed on a monitor 222 of the audit server 220 (e.g., in the form of a table, bar graph, etc.). In this way, a subscriber of the services of the audit engine 232 can readily identify the bias vulnerability of each contributing factor and/or the decision-making system discussed herein.

In one aspect, the computing technology is improved by the concepts discussed herein by being able to provide bias mitigated results within computational constraints provided by a rule set.

While the model repository 204, training data repository 210, rules database 214 and the audit server 220 have been illustrated by way of example to be on different platforms, it will be understood that in various embodiments, their functionality described herein can be combined in various combinations. In other embodiments, these computing platforms may be implemented by virtual computing devices in the form of virtual machines or software containers that are hosted in a cloud, thereby providing an elastic architecture for processing and storage.

Example Building Blocks of a Bias Mitigated System

Figure 3:
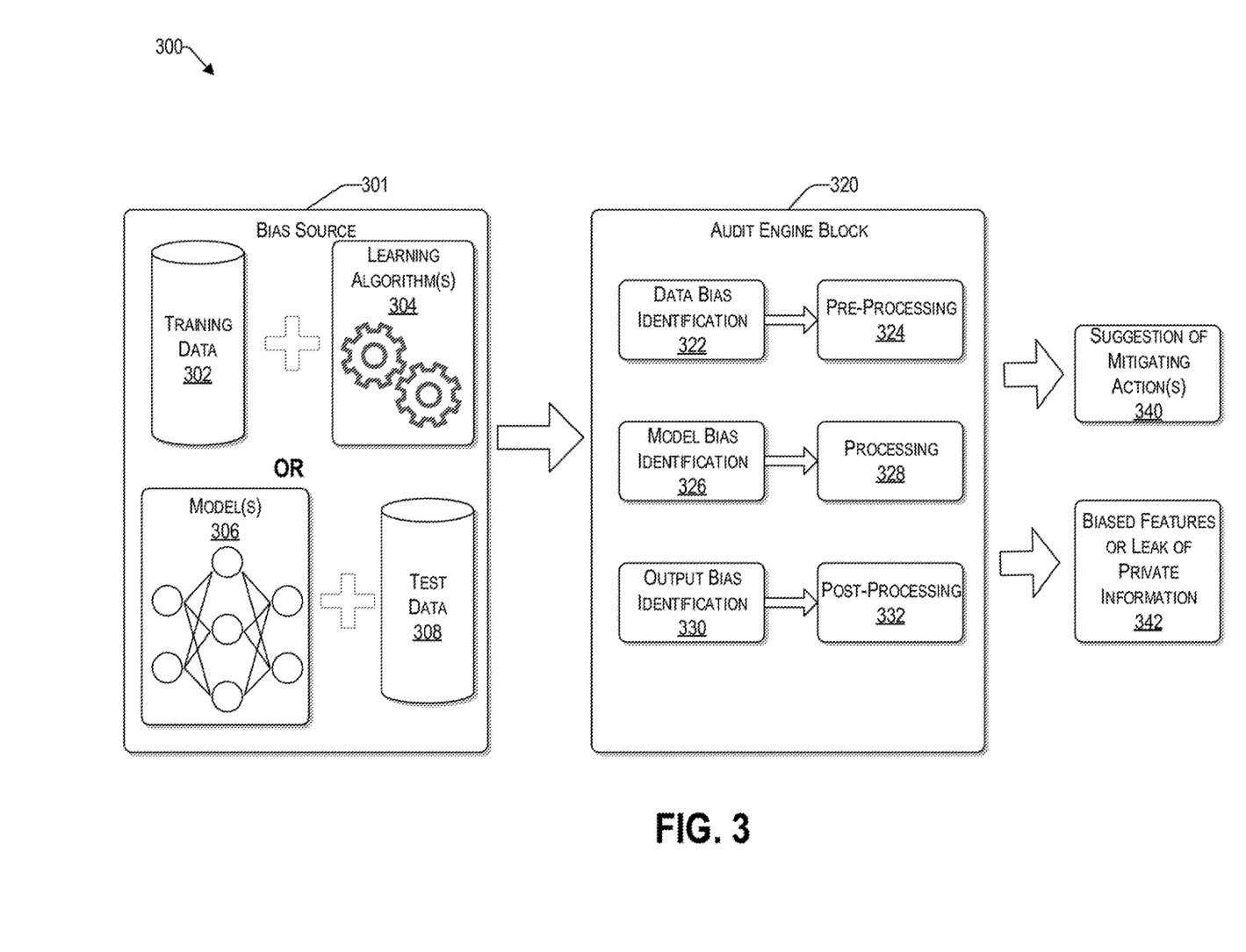
FIG. 3 is a conceptual block diagram of a bias mitigation system, consistent with an illustrative embodiment.

Reference now is made to FIG. 3, which is a conceptual block diagram of a bias mitigation system 300, consistent with an illustrative embodiment. System 300 includes a source of potential bias 301, sometimes referred to herein as the input, and an audit engine block 320, which is configured to provide one or more mitigating actions 340 based on a multi-dimensional analysis of the source of the potential bias 301. In some embodiments, the audit engine block 320 identifies a list of sensitive attributes for each contributing factor of bias or the source 301 in aggregate. These sensitive attributes can be considered biased features and/or leaks of private information 342, which can be provided to an appropriate party that is subscribed to the services described herein.

The source of the potential bias 301 represents the three main contributing factors of bias, namely, (i) the training data 302, (ii) the machine learning model 306, and (iii) the output of the model. The learning algorithm 304 can construct a model 306 using training data 302, which may be a source of bias. The model 306, then is used on test data 308 to provide a computerized model driven decision and/or classification of the test data 308. In various embodiments, the training data 302 or the learning algorithm 304 may or may not be provided to the audit engine block 320.

In one embodiment, the audit engine block 320 includes a data bias identification module 322 that is operative to provide pre-processing functions, represented by the pre-processing module 324, that are in harmony with the subsequent processing 328 and post-processing. The audit engine block 320 includes a model bias identification module 326 that is operative to provide one or more processing options, represented by processing module 328, that are in harmony with the pre-processing module 324 and the post-processing module 332. The audit engine block 320 further includes an output bias identification module 330 that is operative to provide one or more post-processing options, represented by post-processing block 332, that are in harmony with the pre-processing module 324 and the processing module 328. Stated differently, the audit engine block 320 provides one or more mitigating actions 340 based on a multi-dimensional control of pre-processing 324, processing 328, and post-processing 332 stages. By virtue of taking a multi-dimensional approach, a bias mitigation of an automated decision-making systems that uses machine learning models is provided that has a total bias mitigation cost that is within a predetermined threshold, while having a bias immunity (i.e., mitigation) that is above a predetermined threshold.

The pre-processing module 324 of the audit engine block 320 can use or recommend different pre-processing approaches, including, without limitation, sampling or re-weighting the data to neutralize discriminatory effects, changing the individual data records, and using t-closeness approach for discrimination control. In some approaches, an importance of balancing discrimination control against utility of the processed data is considered. In other scenarios, a probabilistic framework for discrimination-preventing pre-processing in supervised learning is supported as well.

In one embodiment, a collection of additional data is considered to create a more balanced training set, for example, by way of statistical parity. For example, consider that the training data 210 is based on a population set X and that has a known subset $S \subset X$ that has a specific attribute. For discussion purposes only, and not by way of limitation, we can assume that X is the general population and S represents people having the attribute of a disability. The concern may be that lenders give fewer loans to people with a disability even though they have a substantially similar credit worthiness as the general population.

Next, we assume that there is a distribution D over X, which represents the probability that any individual will be evaluated for a loan based on test data 212. Stated differently, some members of the population may not be interested in applying for a loan (e.g., they are independently wealthy or do not want to invest), which taken into account by distribution D.

Now suppose we have a classifier provided by the expression below, which may be randomized, providing labels to X.

$$h: X \to \{-1, 1\} \tag{Eq. 1}$$

Accordingly, when given an individual x as input $h(x)=1$ if x receives a loan, and $-1$ if the individual is rejected. The bias, or statistical imparity, of h on S with respect to X, D is provided by the expression below.

$$\text{bias}_h(X, S, D) = Pr[h(x)=1 | x \in S^C] - Pr[h(x)=1 | x \in S] \tag{Eq. 2}$$

Accordingly, the statistical imparity (i.e., bias) is the difference between the probability that a random individual drawn from S is labeled 1 and the probability that a random individual from the complement $S^C$ is labeled 1. The probability is taken both over the distribution D and the random choices made by the algorithm. It calculates the difference that the majority and protected classes (e.g., having sensitive attribute) get a particular outcome. When that difference is small, the classifier has "statistical parity," i.e. to conforms to the notion of fairness, and is therefore considered not to be biased.

However, to achieve statistical parity, the cost may be prohibitive. For example, if the data relates to an event (e.g., disaster relief) existing data may indicate that one group of people may recover more readily than another group in response to such event. But, the audit engine block 320 may determine that the training data is biased because it does not have an adequate sample size. For example, the sample size may be based on a region that was more adversely affected than a neighboring region, where the more adversely affected region has significantly more individuals having a sensitive attribute. Thus, the recommendation may be to include data from the neighboring regions as well. However, if gathering of the recommended additional data is cost prohibitive (e.g., would involve a team of experts to go to that area to perform the survey) or simply does not exist (e.g., the data can no longer be retrieved), it may be impractical or even impossible to satisfy. In this regard, the audit engine block 320 would maintain the present training data but use a more appropriate model in the processing stage 328 and/or perform more aggressive post-processing 312 later to mitigate the total bias inherent in the system, sometimes referred to herein as the system bias.

As mentioned previously, the bias in the training data 302 may be by way of direct discrimination or indirect discrimination. Direct discrimination can be identified by the data bias identification module 322 when decisions are made based on sensitive attributes. Indirect discrimination can be identified by the data bias identification module 322 when decisions are made based on non-sensitive attributes that are strongly correlated with biased sensitive ones. Upon identifying bias in the training data 302, different pre-processing approaches may be used that can reduce the bias in the data. For each pre-processing 324 approach, the audit engine block 320 determines the effectiveness of the approach and the cost thereof. In one embodiment, the audit engine block 320 determines whether each pre-processing approach reduces the bias to a predetermined threshold of the pre-processing stage 324.

The audit engine block 320 includes a model bias identification module 326 to determine whether one or more machine learning models 306 have an inherent bias. To that end, these models 306 are checked for various forms of bias. For example, the model bias identification module 326 may determine whether there is disparate mistreatment, which can arise in an automated decision-making system whose outputs (e.g., decisions) are not completely accurate. For example, if the training data has positive and negative class labels that are not linearly separable, the system may misclassify some people based on their sensitive attributes, thereby leading to disparate mistreatment.

In one embodiment, the model bias identification module 326 also checks for disparate treatment, which can arise when an automated decision-making system provides different outputs for groups of individuals with similar or even same values of non-sensitive attributes but different values of sensitive attributes.

Upon the model bias identification module 326 identifying that there is bias in the model, a level of bias is identified and a cost of using the model are determined. To that end the processing module 328 runs different classification or regression algorithms, including algorithms that are more fairness-aware, to determine a level of bias for each model 306 and the cost thereof. In this way, the effectiveness (e.g., percentage of bias mitigated) by each model 306 and its associated cost are determined.

In one embodiment, there is an output bias identification module 330 that checks the bias identified in the output of each model. Upon the output bias identification module 330 of the audit engine block 320 determining that there is bias, different post processing techniques are evaluated by the post-processing module 332 to determine their effectiveness (e.g., percentage of bias mitigated) and associated mitigation cost. In one embodiment, the post-processing module 332 determines whether a post-processing approach reduces the bias to a predetermined threshold of the post-processing stage.

Figure 4:
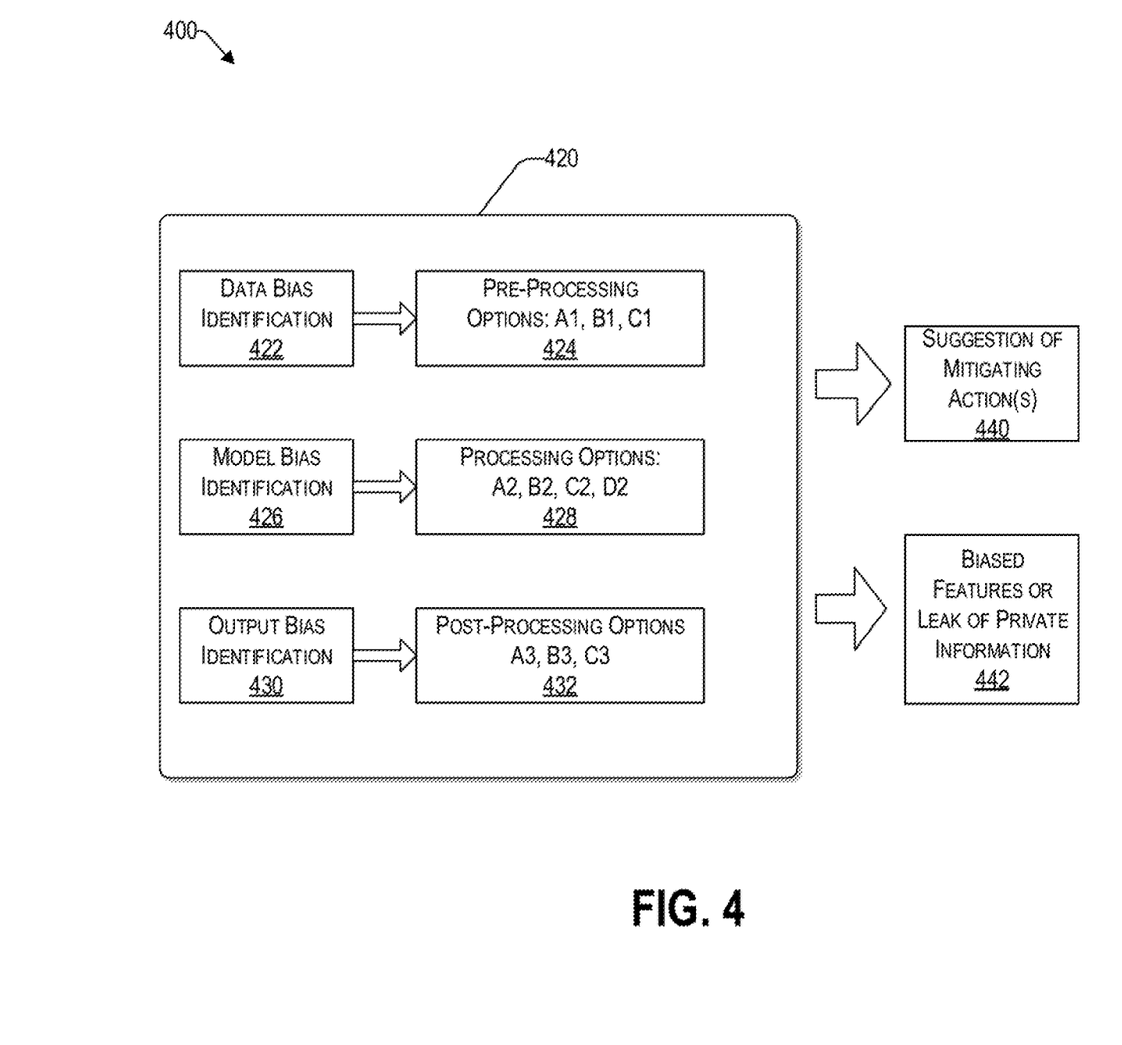
FIG. 4 provides a more detailed explanation of the audit engine block of FIG. 3, consistent with an illustrative embodiment.

Reference now is made to FIG. 4, which provides a more detailed explanation of the audit engine block 420, consistent with an illustrative embodiment. For purposes of discussion, system 400 is described below by way of an example configuration, while it will be understood that other configurations are possible as well.

Upon determining that there is bias in the training data, the data bias identification module of the audit engine block 420 can provide different pre-processing techniques to mitigate the bias, represented by way of example as options A1, B1, and C1. For each pre-processing technique, the effectiveness of the technique is determined and the cost thereof. In one embodiment, if a pre-processing technique does not sufficiently mitigate bias (i.e., is below a predetermined threshold), it is disqualified from further consideration. Each pre-processing approach, the contribution to system bias immunity (i.e., mitigation of bias), and its corresponding cost are recorded in a memory of the audit server or a database connected thereto. The data may be in the form of a reference table. In this regard, reference is made to FIG. 5, which is an example table for mitigation of the contributing factors for the system of FIG. 4, consistent with an illustrative embodiment. In particular, table 500 illustrates the options available for each mitigation stage, the bias immunity/mitigation, and cost. In one embodiment, table 500 further includes a column indicating whether a threshold bias reduction for the corresponding option of the mitigation stage is met.

Returning to FIG. 4, the model bias identification module 426 evaluates different models (i.e., models A2 to D2 in the present example) for a level of inherent bias and a cost of running the model. To that end, one or more models are analyzed for bias. For example, there may be four different models A2 to D2 available to analyze test data. While model A2 may provide the most accuracy and the least amount of bias, it may be computing resource intensive (and thus of high cost). Model B2 may not sufficiently mitigate bias based on the present data set 212. In one embodiment, if a threshold bias reduction (which may be provided by a rule set) is not met, the model is automatically disqualified.

In the present example, model C2, provides sufficient system mitigation of bias, while not being computing resource intensive. Accordingly, model C2 is of lower cost than model A2. Model D2 may also not provide a substantial mitigation of bias, but is sufficient, and has a computing resource overhead that is less intensive than that of model C. In this scenario, the audit engine 232 may automatically disqualify model B2 because it does not meet a system bias immunity (i.e., mitigation) to a predetermined threshold (e.g., 10% in this example). Instead, model D may be selected, with the understanding that additional mitigation measures are performed in the post-processing stage. Models A2 and C2 substantially increase system cost and may not be selected—a determination which will be made upon all three mitigation approaches of pre-processing, processing and post-processing are evaluated by the audit engine block 420. The different options for the processing stage are summarized by way of example in table 500 of FIG. 5.

Figure 5:
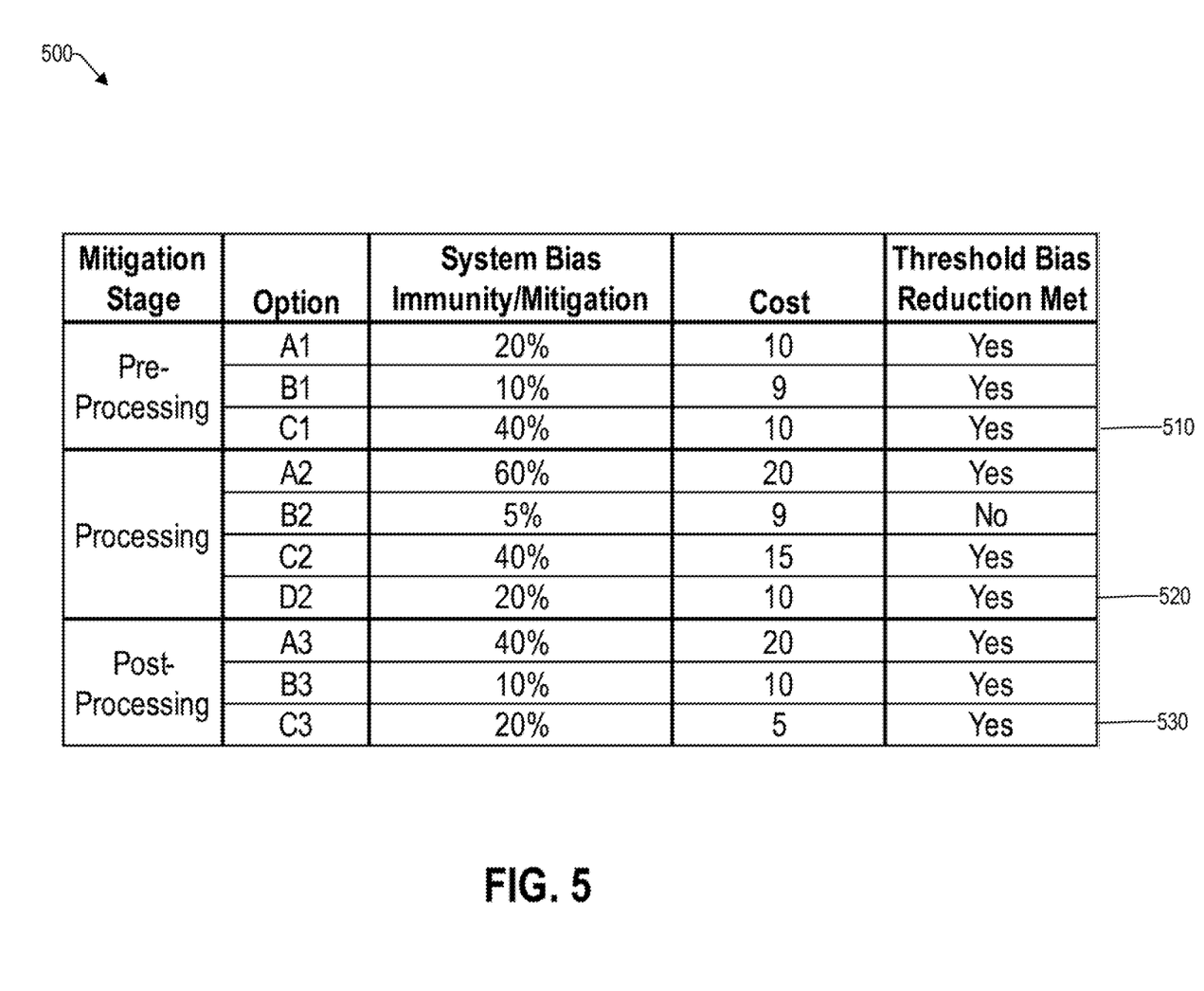
FIG. 5, which is an example table for mitigation of the contributing factors for the system of FIG. 4, consistent with an illustrative embodiment.

Similarly, several post-processing choices may be offered (A3 to C3 in the present example) by the post-processing options module 432 of the audit engine block 420, each having a different cost and effectiveness, as described by way of example in table 500 of FIG. 5. Assume, for example, that the rule set indicates that the system bias immunity should be 78% or higher and that there is a cost limit of 25. In our present example, the combination of options C1 (row 510) for the pre-processing stage, D2 (row 520) for the processing stage, and C3 (row 530) for the post-processing stage meets the total cost limit of 25 and provides a system bias immunity of 80%, which is within the limitations of the rule set. Accordingly, unlike traditional approaches that provide a mitigation solution of a contributing factor of bias individually such that a contributing factor is optimized individually, the audit engine block 240 takes a holistic view of the bias mitigation system to find a combination of mitigation measures that is of lowest cost, while being within a predetermined threshold system bias immunity.

Example Process

Figure 6:
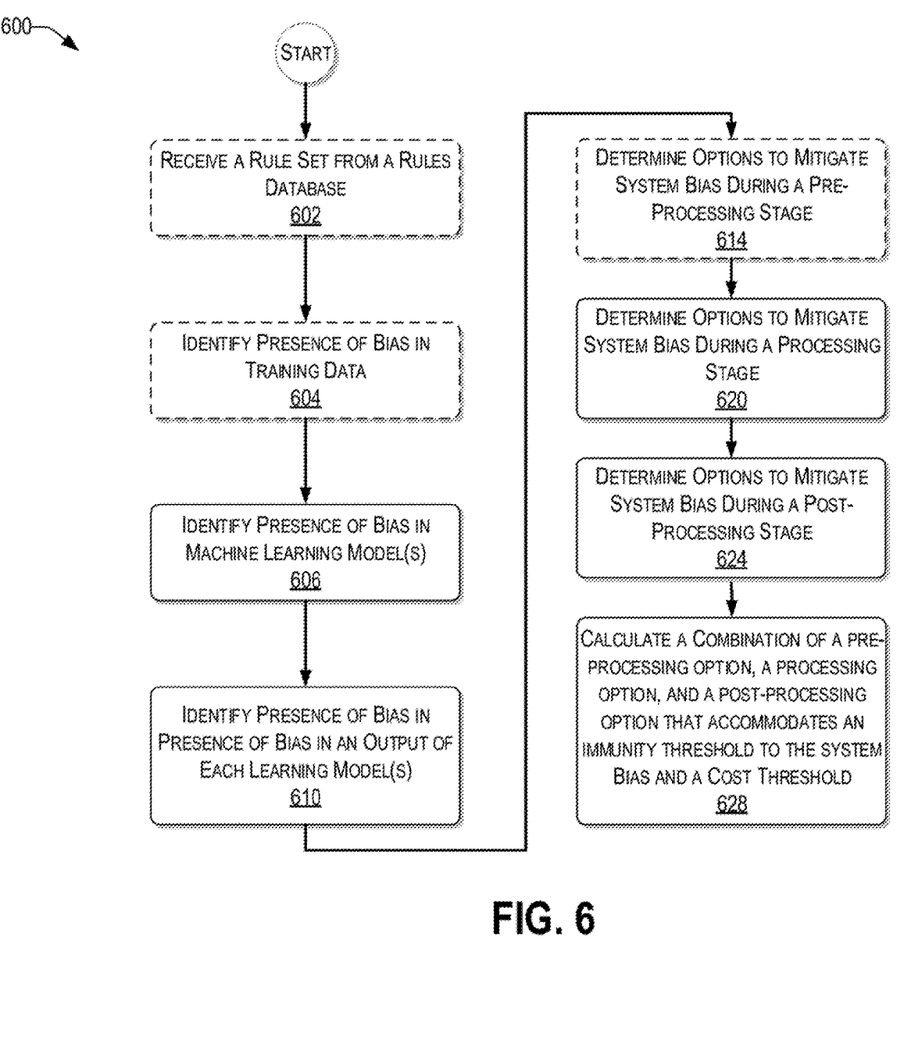
FIG. 6 presents an illustrative process for mitigating bias in an automated decision-making system.

With the foregoing overview of the machine learning system 100, example architecture 200 for implementing a system that audits an automated decision-making system against bias, and block diagram of a bias mitigation system 300, it may be helpful now to consider a high-level discussion of an example process. To that end, FIG. 6 presents an illustrative process 600 for mitigating bias in an automated decision-making system. Process 600 is illustrated as a collection of blocks in a process, representing a sequence of operations that can be implemented in hardware, software, or a combination thereof. In the context of software, the blocks represent computer-executable instructions that, when executed by one or more processors, perform the recited operations. Generally, computer-executable instructions may include routines, programs, objects, components, data structures, and the like that perform particular functions or implement particular abstract data types. The order in which the operations are described is not intended to be construed as a limitation, and any number of the described blocks can be combined in any order and/or performed in parallel to implement the process. For discussion purposes, the process 600 is described with reference to the architecture 200 of FIG. 2.

As mentioned previously, there may be a rules database 214 that stores the constraints and/or preferences under which the system is to operate in the context of a rule set. In one embodiment, at block 602, the audit engine 232 retrieves the rule set from the rules database 214.

In some embodiments, the training data is made available to the audit engine 232. In this regard, in block 604, the audit engine 232 receives the training data 205 and identifies the presence of bias in the training data 205 of an automated decision-making system 200.

At block 606, the audit engine 232 identifies a presence of bias in one or more machine learning models of the decision-making system based on the training data.

At block 610, for each of the one or more machine learning models 203, the training engine 232 identifies a presence of bias in an output of the machine learning model.

At block 614, if the training data was previously received and the audit engine 232 identifies a presence of bias therein, at block 614, the audit engine 232 determines one or more options to mitigate a system bias during a pre-processing stage (e.g., A1, B1, C1, . . . ). The mitigation options of the pre-processing stage are configured to mitigate the system bias by reducing the bias of the training data.

At block 620, the audit engine 232 determines one or more options to mitigate a system bias during a processing stage (e.g., A2, B2, C2, . . . ). The mitigation options of the processing stage are configured to mitigate the system bias by identifying models 203 based on the training data that are configured to have a reduced model bias.

At block 624, the audit engine 232 determines one or more options to mitigate a system bias during a post-processing stage (e.g., A3, B3, C3, . . . ). The mitigation options of the post-processing stage are configured to mitigate the system bias by reducing the bias of the output data for an output of each model.

At block 628, the audit engine 232 provides a combination including a pre-processing option (e.g., A1, B1, C1, . . . ) (if available), a processing option (e.g., A2, B2, C2, . . . ), and a post-processing option (e.g., A3, B3, C3, . . . ) that accommodates (i) an immunity threshold to the system bias of the decision-making system and (ii) a cost threshold.

Example Computer Platform

Figure 7:
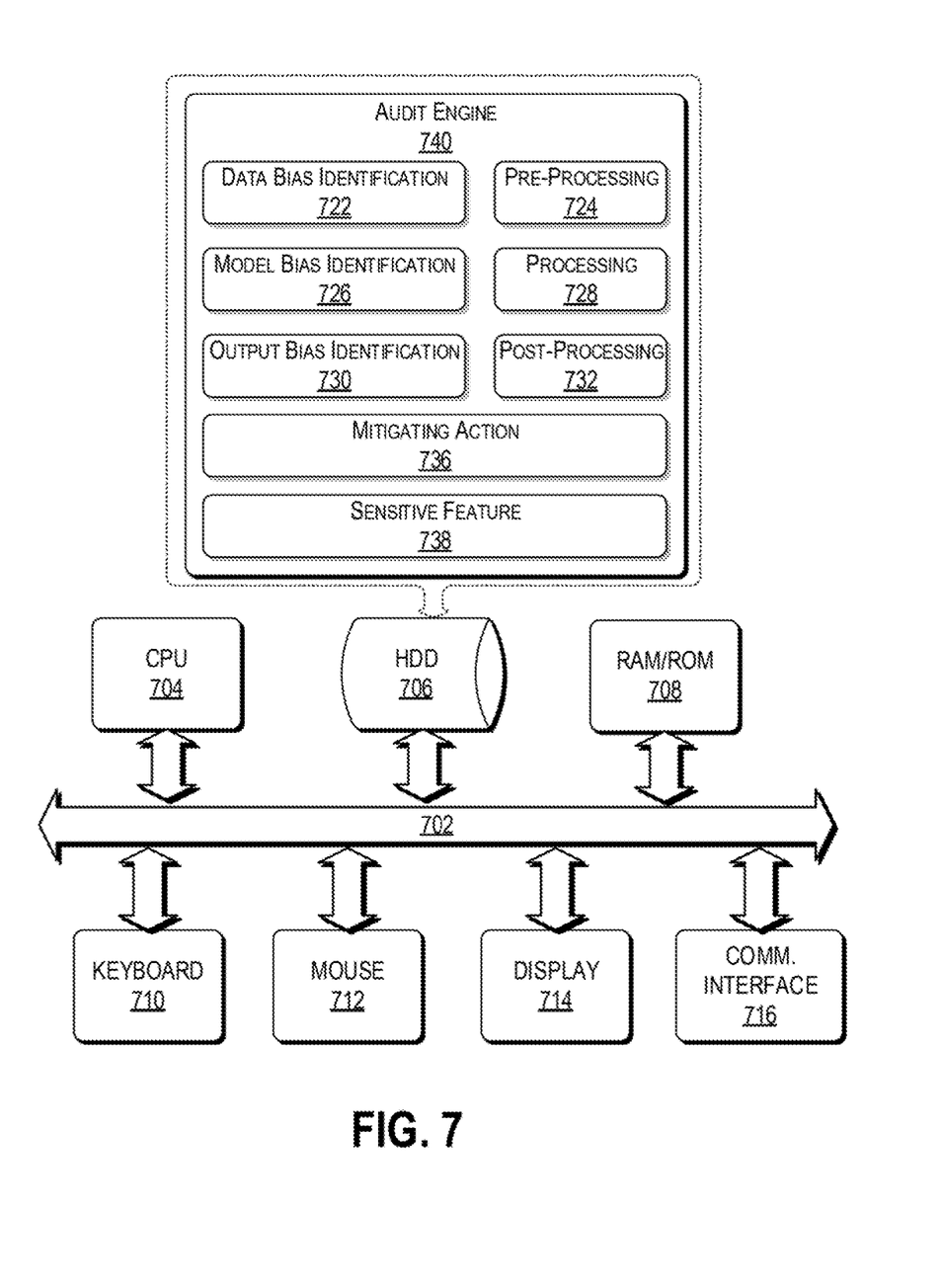
FIG. 7 provides a functional block diagram illustration of a computer hardware platform such as a computing device that can implement an audit server.

As discussed above, functions relating to identifying the presence of bias in a training data, one or more machine learning models, an output of the machine learning models; providing options to mitigate bias during a pre-processing stage, processing stage, and post-processing stage; and providing a combination of options that best accommodate an immunity threshold to the system bias of the decision-making system and a cost threshold, can be performed with the use of one or more computing devices connected for data communication via wireless or wired communication, as shown in FIG. 2. To that end, FIG. 7 provides a functional block diagram illustration of a computer hardware platform such as a computing device that can implement an audit server.

The computer platform 700 may include a central processing unit (CPU) 704, a hard disk drive (HDD) 706, random access memory (RAM) and/or read only memory (ROM) 708, a keyboard 710, a mouse 712, a display 714, and a communication interface 716, which are connected to a system bus 702.

In one embodiment, the HDD 706, has capabilities that include storing a program that can execute various processes, such as the audit engine 740, in a manner described herein. The audit engine 740 may have modules configured to perform different functions discussed herein.

In one embodiment, there is a data bias identification module 722 operative to identify inherent bias in a training data 205. There may be a pre-processing module 724 that can determine different pre-processing approaches based on the data bias identified by the data bias identification module 722.

In one embodiment, there is a model bias identification module 726 operative to identify bias in a model 203. There may be a processing module 728 that is operative to provide different models, their effectiveness in mitigating bias, and cost thereof, based on the bias identification provided by the model bias identification module 726.

In one embodiment, there is an output bias identification module 730 operative to determine an output bias of each model provided by the processing module 728. There may be a processing module 732 that can provide different post-processing approaches based on the output bias identified by the output bias identification module 730.

In one embodiment, there is a mitigating action module 736 operative to analyze the different pre-processing, processing, and post-processing options to provide a combination of options that is above an immunity threshold for the system. In some embodiments, the mitigating action module 736 further limits the combination to those that are within a cost threshold that may be provided by the rule set. The cost threshold may be based on at least one of (i) computing resources involved, (ii) time involved, (iii) energy involved, and (iv) monetary cost of the mitigation option.

In one embodiment, there is a sensitive attribute module 738 that is operative to identify sensitive attributes, which can be considered biased features and/or leaks of private information in the automated decision making-system being analyzed by the audit engine. These sensitive attributes can be reported to an appropriate party, such as a subscriber to the services described herein.

In one embodiment, a program, such as Apache™, can be stored for operating the system as a Web server. In one embodiment, the HDD 706 can store an executing application that includes one or more library software modules, such as those for the Java™ Runtime Environment program for realizing a JVM (Java™ virtual machine).

CONCLUSION

The descriptions of the various embodiments of the present teachings have been presented for purposes of illustration but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

While the foregoing has described what are considered to be the best state and/or other examples, it is understood that various modifications may be made therein and that the subject matter disclosed herein may be implemented in various forms and examples, and that the teachings may be applied in numerous applications, only some of which have been described herein. It is intended by the following claims to claim any and all applications, modifications and variations that fall within the true scope of the present teachings.

The components, steps, features, objects, benefits and advantages that have been discussed herein are merely illustrative. None of them, nor the discussions relating to them, are intended to limit the scope of protection. While various advantages have been discussed herein, it will be understood that not all embodiments necessarily include all advantages. Unless otherwise stated, all measurements, values, ratings, positions, magnitudes, sizes, and other specifications that are set forth in this specification, including in the claims that follow, are approximate, not exact. They are intended to have a reasonable range that is consistent with the functions to which they relate and with what is customary in the art to which they pertain.

Numerous other embodiments are also contemplated. These include embodiments that have fewer, additional, and/or different components, steps, features, objects, benefits and advantages. These also include embodiments in which the components and/or steps are arranged and/or ordered differently.

Aspects of the present disclosure are described herein with reference to call flow illustrations and/or block diagrams of a method, apparatus (systems), and computer program products according to embodiments of the present disclosure. It will be understood that each step of the flowchart illustrations and/or block diagrams, and combinations of blocks in the call flow illustrations and/or block diagrams, can be implemented by computer readable program instructions.

These computer readable program instructions may be provided to a processor of a computer, special purpose computer, or other programmable data processing apparatus to produce a machine, such that the instructions, which execute via the processor of the computer or other programmable data processing apparatus, create means for implementing the functions/acts specified in the call flow process and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the call flow and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the call flow process and/or block diagram block or blocks.

The flowchart and block diagrams in the Figures illustrate the architecture, functionality, and operation of possible implementations of systems, methods, and computer program products according to various embodiments of the present disclosure. In this regard, each block in the call flow process or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or call flow illustration, and combinations of blocks in the block diagrams and/or call flow illustration, can be implemented by special purpose hardware-based systems that perform the specified functions or acts or carry out combinations of special purpose hardware and computer instructions.

While the foregoing has been described in conjunction with exemplary embodiments, it is understood that the term "exemplary" is merely meant as an example, rather than the best or optimal. Except as stated immediately above, nothing that has been stated or illustrated is intended or should be interpreted to cause a dedication of any component, step, feature, object, benefit, advantage, or equivalent to the public, regardless of whether it is or is not recited in the claims.

It will be understood that the terms and expressions used herein have the ordinary meaning as is accorded to such terms and expressions with respect to their corresponding respective areas of inquiry and study except where specific meanings have otherwise been set forth herein. Relational terms such as first and second and the like may be used solely to distinguish one entity or action from another without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "a" or "an" does not, without further constraints, preclude the existence of additional identical elements in the process, method, article, or apparatus that comprises the element.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments have more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separately claimed subject matter.

What is claimed is:

1. A computing device comprising:
    a processor;
    a network interface coupled to the processor to enable communication over a network;
    a storage device coupled to the processor;
    an audit engine stored in the storage device, wherein an execution of the audit engine by the processor configures the computing device to perform acts, comprising:
    identifying a presence of bias in one or more machine learning models of a decision-making system;
    identifying a presence of bias in a training data of the decision-making system;
    for each of the one or more machine learning models, identifying a presence of bias in an output of the machine learning model;
    determining one or more options to mitigate a system bias during a processing stage, based on the identified presence of bias for each of the one or more machine learning models and on the identified presence of bias in each output of the one or more machine leaning models;
    displaying on a monitor of the computing device:
        a score indicating a level of bias in the training data based on a predetermined scale:
        for each one or more machine learning models, a score indicating a level of bias in the model; and
        for each output of the one or more machine learning models, a score indicating a level of bias in the output; and
    providing a combination of options, comprising (i) at least one processing option for the processing stage selected from the one or more options to mitigate the system bias during the processing stage, and (ii) at least one post-processing option for the post-processing stage selected from the one or more options to mitigate the system bias during the post-processing stage, wherein the combination of options accommodates a threshold bias limit to the system bias and a total bias mitigation cost threshold of the decision-making system.

2. The computing device of claim 1 wherein each of the one or more models is based on the training data.

3. The computing device of claim 1, wherein execution of the audit engine further configures the computing device to perform an act, comprising: determining one or more options to mitigate a system bias during a pre-processing stage, based on the determined presence of bias in the training data.

4. The computing device of claim 3, wherein the combination of options further includes at least one pre-processing option for the pre-processing stage selected from the one or more options to mitigate the system bias during the pre-processing stage.

5. The computing device of claim 1, wherein the total bias mitigation cost threshold is based on at least one of: (i) a computing resources involved, (ii) a time involved, (iii) an energy involved, and (iv) a monetary cost, of the combination of options.

6. The computing device of claim 5, wherein:
    the processing stage and the post-processing stage each have a different type of bias mitigation cost;
    execution of the audit engine further configures the computing device to perform acts comprising:
        applying an equalization factor to the type of cost of the processing stage to obtain a universal cost of each option of the processing stage;
        applying an equalization factor to the type of cost of the post-processing stage to obtain a universal cost of each option of the post-processing stage; and
    the total bias mitigation cost threshold of the decision-making system is based on a total universal cost of the at least one selected processing option for the processing stage plus the at least one selected post-processing option for the post-processing stage.

7. The computing device of claim 1, wherein execution of the audit engine further configures the computing device to perform acts, comprising:
    identifying one or more sensitive attributes used in the decision-making system; and
    reporting each of the one or more sensitive attributes as at least one of a (i) biased feature and (ii) a leak of private information.

8. The computing device of claim 1, wherein identifying the presence of bias in one or more machine learning models comprises at least one of:
    identifying a direct discrimination; and
    identifying an indirect discrimination.

9. A non-transitory computer readable storage medium tangibly embodying a computer readable program code having computer readable instructions that, when executed, causes a computing device to carry out a method of mitigating bias in a decision-making system, the method comprising:
    identifying a presence of bias in one or more machine learning models of the decision-making system;
    identifying a presence of bias in a training data of the decision-making system;

for each of the one or more machine learning models, identifying a presence of bias in an output of the machine learning model;

determining one or more options to mitigate a system bias during a processing stage, based on the identified presence of bias for each of the one or more machine learning models and on the identified presence of bias in each output of the one or more machine leaning models;

displaying on a monitor of the computing device:
- a score indicating a level of bias in the training data based on a predetermined scale:
- for each one or more machine learning models, a score indicating a level of bias in the model; and
- for each output of the one or more machine learning models, a score indicating a level of bias in the output; and providing a combination of options, comprising (i) a processing option for the processing stage selected from the one or more options to mitigate the system bias during the processing stage, and (ii) a post-processing option for the post-processing stage selected from the one or more options to mitigate the system bias during the post-processing stage, wherein the combination of options accommodates a threshold bias limit to the system bias and a total bias mitigation cost threshold of the decision-making system.

10. The non-transitory computer readable storage medium of claim 9, wherein each of the one or more models is based on the training data.

11. The non-transitory computer readable storage medium of claim 9, further comprising: determining one or more options to mitigate a system bias during a pre-processing stage, based on the determined presence of bias in the training data.

12. The non-transitory computer readable storage medium of claim 11, wherein the combination of options further includes a pre-processing option for the pre-processing stage selected from the one or more options to mitigate the system bias during the pre-processing stage.

13. The non-transitory computer readable storage medium of claim 9, wherein the total bias mitigation cost threshold is based on at least one of: (i) a computing resources involved, (ii) a time involved, (iii) an energy involved, and (iv) a monetary cost, of the combination of options.

14. The non-transitory computer readable storage medium of claim 13, wherein the processing stage and the post-processing stage each have a different type of bias mitigation cost.

15. The non-transitory computer readable storage medium of claim 13, further comprising:
- applying an equalization factor to the type of cost of the processing stage to obtain a universal cost of each option of the processing stage; and
- applying an equalization factor to the type of cost of the post-processing stage to obtain a universal cost of each option of the post-processing stage, wherein the total bias mitigation cost threshold of the decision-making system is based on a total universal cost of the selected processing option for the processing stage plus the selected post-processing option for the post-processing stage.

16. The non-transitory computer readable storage medium of claim 9, further comprising:
- identifying one or more sensitive attributes used in the decision-making system; and
- reporting each of the one or more sensitive attributes as at least one of a (i) biased feature and (ii) a leak of private information.

17. The non-transitory computer readable storage medium of claim 9, wherein identifying the presence of bias in one or more machine learning models comprises at least one of:
- identifying a direct discrimination; and
- identifying an indirect discrimination.

* * * * *